United States Patent [19]

Roberts

[11] Patent Number: 4,691,627
[45] Date of Patent: Sep. 8, 1987

[54] APPARATUS FOR MAKING FILLED FOOD ARTICLES

[75] Inventor: Gary F. Roberts, Colona, Ill.

[73] Assignee: The Kartridg Pak Co., Davenport, Iowa

[21] Appl. No.: 819,751

[22] Filed: Jan. 16, 1986

[51] Int. Cl.$^4$ .................. A21C 9/00; A21C 11/00
[52] U.S. Cl. .................. 99/450.6; 99/450.2; 99/450.7
[58] Field of Search .......... 99/450.1, 450.8, 352–356; 53/465, 461, 216, 211, 210, 206; 426/500–502, 725, 414, 391, 282–284

[56] References Cited

U.S. PATENT DOCUMENTS

| | | | |
|---|---|---|---|
| 1,844,142 | 2/1932 | Barili | 99/450.2 |
| 2,714,861 | 8/1955 | Castronuovo | 99/450.2 |
| 3,605,641 | 9/1971 | Shuster | 99/450.7 |
| 4,516,487 | 5/1985 | Madison et al. | 99/450.6 |

Primary Examiner—Timothy F. Simone
Attorney, Agent, or Firm—Lockwood, Alex, FitzGibbon & Cummings

[57] ABSTRACT

Apparatus for making food products, such as burritos, having fillings wrapped or enrobed in dough sheets, such as tortillas. Dough sheets are conveyed to a first station of the apparatus wherein a rotatably reversing crease-forming roller operates in conjunction with the discharge end of a dough sheet conveyor and its non-reversing end roller to form a downward crease or groove in each dough sheet while simultaneously a predetermined quantity of filling is deposited into the crease or groove. Each dough sheet having a crease or groove with a filling deposited therein is conveyed through a series of stations wherein the dough sheet is folded and formed into a wrapper encasing or enrobing the filling.

4 Claims, 11 Drawing Figures

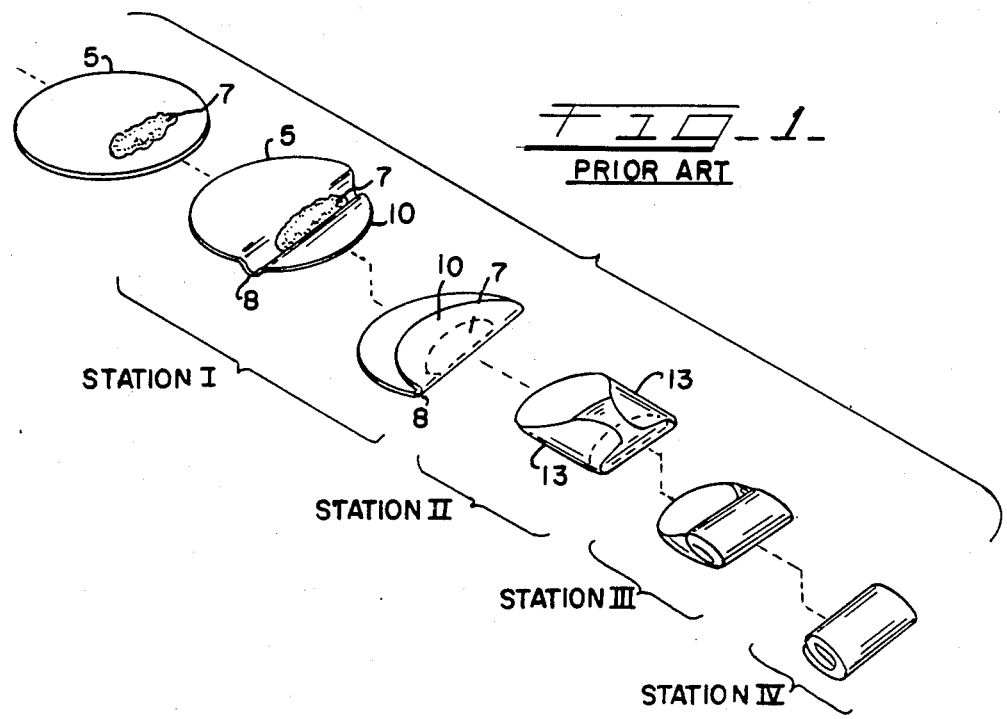
FIG_1_
PRIOR ART
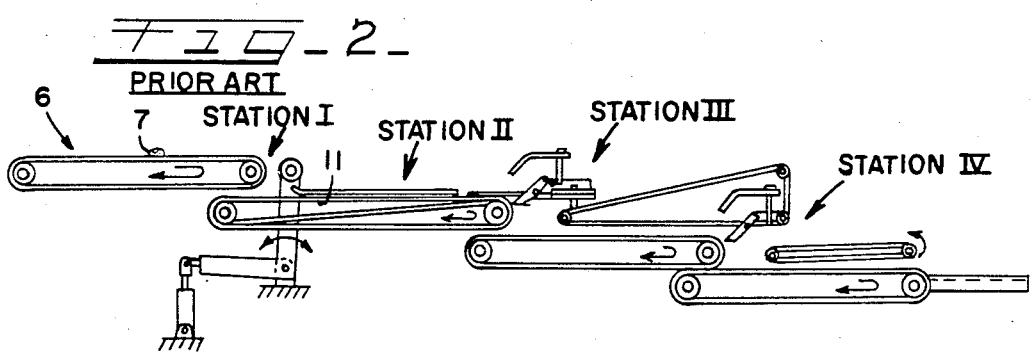
FIG_2_
PRIOR ART
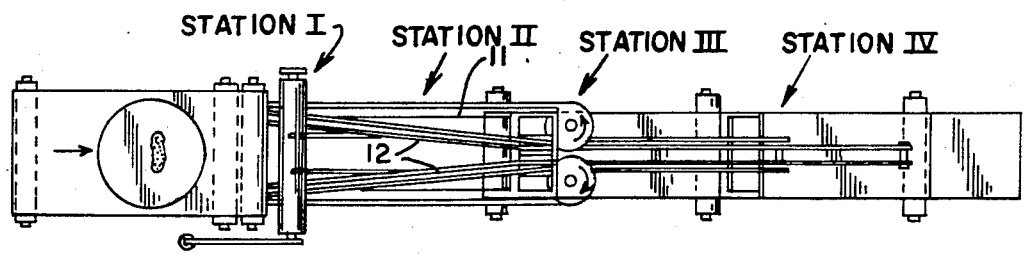
FIG_3_
PRIOR ART

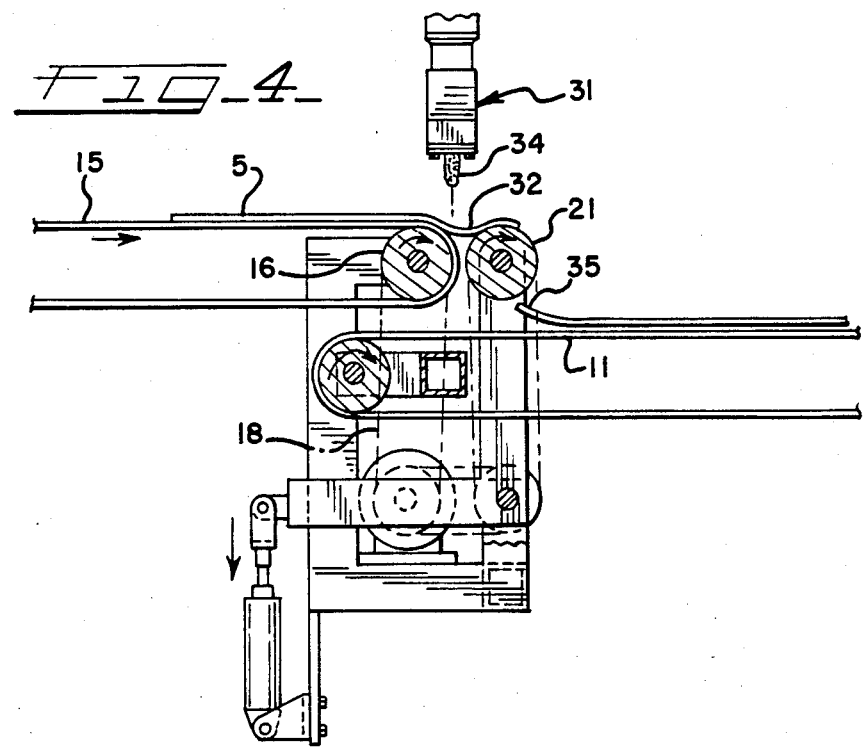
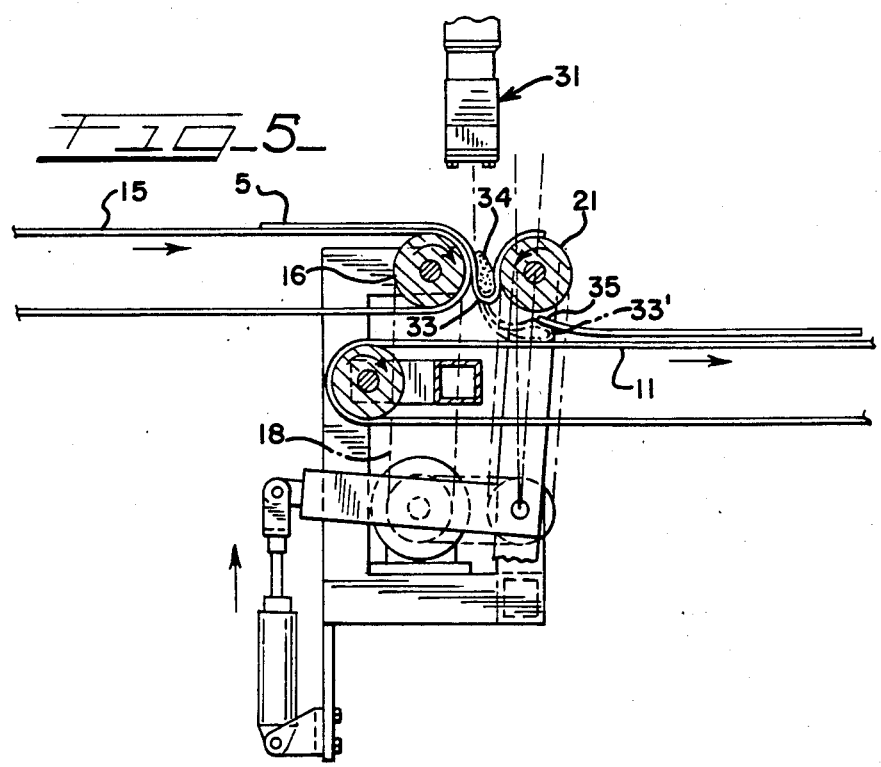

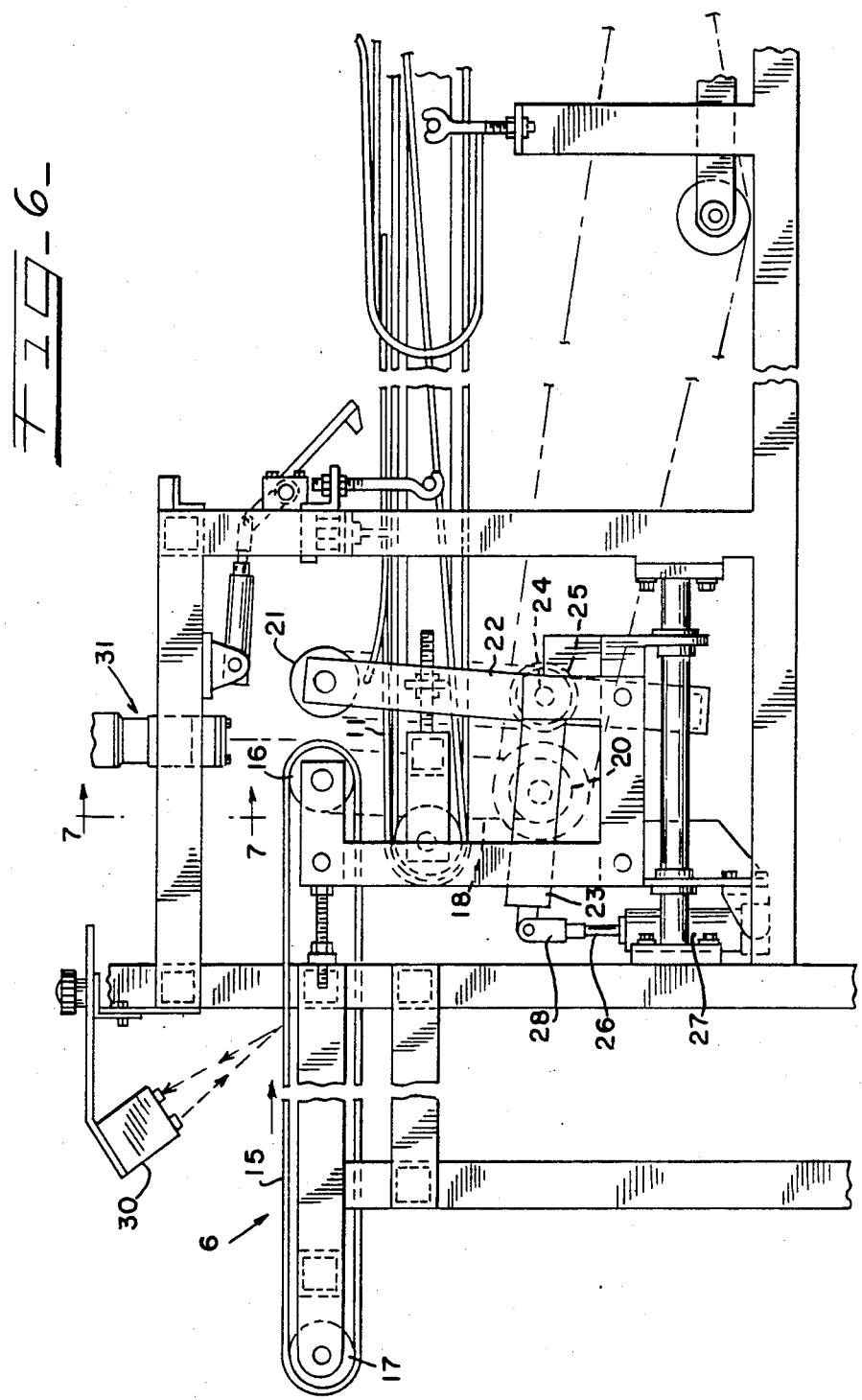

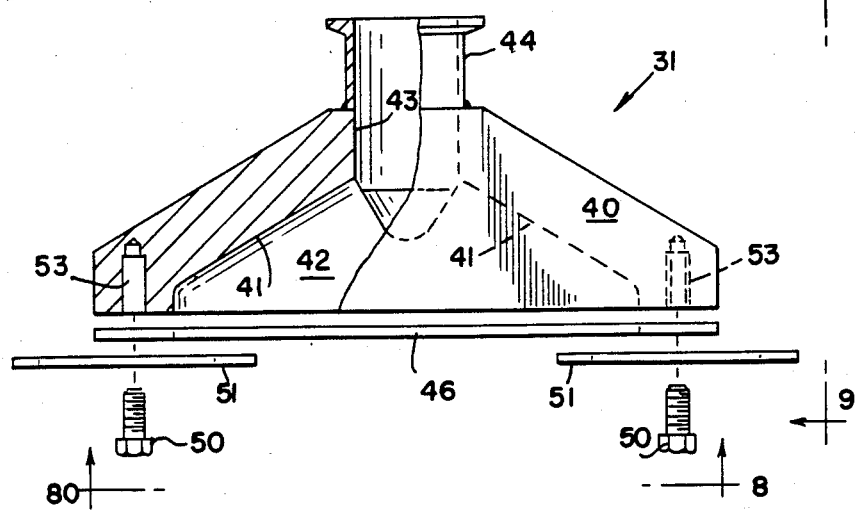
Fig-7-
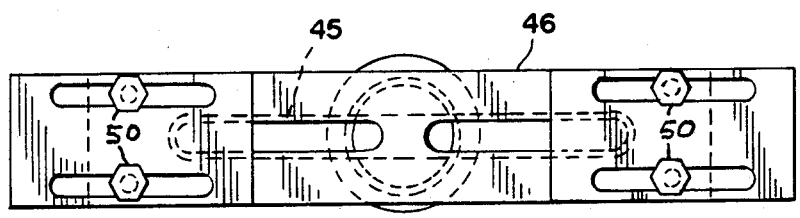
Fig-8-
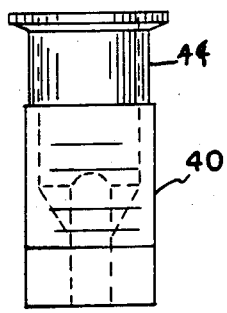
Fig-9-
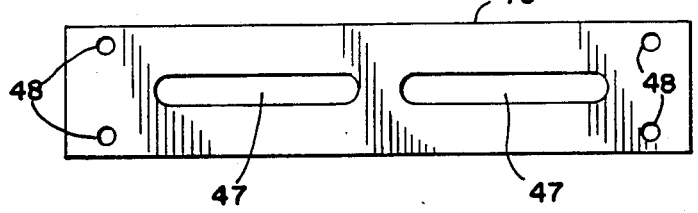
Fig-10-
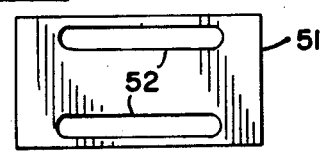
Fig-11-

APPARATUS FOR MAKING FILLED FOOD ARTICLES

This invention relates generally to improvements in apparatus and method of depositing a food filling on a dough sheet and thereafter forming the dough sheet so as to complete a wrapper which encloses the filling. More particularly, the invention relates to improvements in such apparatus and method as shown and disclosed in U.S. Pat. No. 4,516,487 dated May 14, 1985.

U.S. Pat. No. 4,516,487 discloses a tortilla folding machine tortilla having a filling deposited thereon is conveyed progressively through what are designated as Stations I, II, III and IV. In Station I, a crease or groove is formed in the portion of the tortilla underlying the filling and then the leading or forward portion of the tortilla is folded rearwardly over the filling so as to form a fold at the front which extends generally transversely to the conveying direction. In Station II, the opposite sides or flaps of the tortilla are folded upwardly, inwardly and downwardly so as to form side folds which extend generally parallel to each other and to the direction the tortillas are being conveyed. In Stations III and IV, each partially formed product or article is folded rearwardly so that the tortilla or dough sheet becomes completely wrapped around the filler completing the formation of the burrito or similar filling food product.

The present invention relates particularly to Station I of the apparatus shown in U.S. Pat. No. 4,516,487 whereat a downwardly extending crease or fold is formed transversely in the leading portion of each tortilla or other dough sheet whereat the food filling has already been deposited before reaching Station I. In the operation of the apparatus shown and described in U.S. Pat. No. 4,516,487, after the transverse filling-containing crease or fold is formed, the leading portion of the tortilla is folded upwards and backwards over the filling while still in Station I.

In Station II of the apparatus the side portions or flaps of the dough sheet or tortilla are enfolded. This enfolding function or operation is performed by a pair of side belts which extend along opposite sides of a horizontal conveyor on which the partially formed burrito is being conveyed in a forward direction through the machine. The opposing side belts act to engage the undersides of the opposite flaps of the dough sheet and raise the same upwardly and then fold them inwardly and downwardly. The resulting side folds are substantially parallel to each other and to the direction of movement of the conveyor. In Station III and IV the product is rotated rearwardly on itself thereby completing the wrapping operations.

As illustrated and shown in U.S. Pat. No. 4,516,487, each dough sheet or tortilla being fed into the apparatus already has a transverse filling deposited in the appropriate place thereon whereat the downward crease or groove will be formed in Station I. However, there is no disclosure or showing in U.S. Pat. No. 4,516,487 of a means or method for depositing the foodstuff fillings onto the successive tortillas. In an operating machine built generally to conform with the disclosure of U.S. Pat. No. 4,516,487, such fillings were deposited by a reciprocating nozzle traveling forwardly during filling ejection at the same speed as the tortillas were being conveyed. This traveling nozzle arrangement required flexible connections and had several other inherent disadvantages. The stream of filling ejected from the nozzle at the appropriate time had to travel both downwardly and forwardly. As a result, there was difficulty in confining the stream to the precise location desired on the tortillas and there was a tendency for the filling to spread or splash over undesirably large areas of the tortilla top surfaces.

In Station I in the apparatus and method of the present invention the nozzle which deposits a predetermined quantity of filling on each dough sheet (e.g. tortilla) is stationary instead of traveling. From the stationary nozzle each filling is deposited on the narrow transverse area of each dough sheet whereat a downward groove or crease is being formed. Furthermore, the downward impact of the filling on a dough sheet serves to help form the crease or groove in which the filling is received.

The object of the invention, generally stated, is the provision of an improved means and method of depositing the fillings in burrito-forming machines and similar apparatus of the type shown and described in U.S. Pat. No. 4,516,487, which improved means resides in a stationary nozzle from which the filling for each tortilla or other dough sheet is deposited in a downward stream thereon so as to accurately impact the dough sheet in a confined transverse area which is formed into a filled groove or crease.

An important object of the invention is the deposition of fillings from a stationary nozzle on a dough sheet, such as a tortilla, in apparatus of the type disclosed in U.S. Pat. No. 4,516,487, in such a way that the impact area of the filling on each dough sheet is partially supported by a crease or groove forming roller so that the impact is only partially resisted by the dough sheet.

Certain other objects and advantages of the invention will be apparent to those skilled in the art in view of the following detailed description of the best embodiment of the invention in connection with the accompanying drawings, wherein:

FIGS. 1, 2 and 3 represent the prior art and correspond to FIGS. 1, 2 and 3 respectively, of U.S. Pat. No. 4,516,487, FIG. 1 being a schematic representation illustrating the progressive folding of a tortilla during the formation of a burrito by the apparatus of that patent, FIG. 2 being a diagrammatic side elevation of the apparatus of that patent, and FIG. 3 being a plan view thereof;

FIG. 4 is a detail side elevation depicting Station I of the apparatus of the present invention as a tortilla or other dough sheet is received and before a filling is deposited thereon and a groove or crease is formed therein;

FIG. 5 is a view corresponding to FIG. 4 but depicting the formation of a groove or crease in the dough sheet and the simultaneous deposition of a filling therein;

FIG. 6 is a side elevation of Station I of the apparatus of the present invention and showing the tortilla feeding conveyor and first-folding mechanism;

FIG. 7 is a side elevational view on enlarged scale taken on line 7—7 of FIG. 6 of the filling depositing nozzle and showing the nozzle outlet plate removed;

FIG. 8 is a bottom plan view of the nozzle taken on line 8—8 of FIG. 7;

FIG. 9 is an end elevation view of the nozzle taken on line 9—9 of FIG. 7;

FIG. 10 is a plan view of the outlet plate for the nozzle of FIG. 7; and

FIG. 11 is a plan view of one of the adjustable end plates used to adjust the effective length of the outlet in the nozzle plate of FIG. 10.

As stated above, the present invention is in the nature of an improvement on known apparatus and machines for folding a dough sheet such as a tortilla shell so as to enclose a foodstuff filling, such as a burrito filling, to form burritos or similar products. Also, as stated above, one such known apparatus or tortilla-folding machine is shown and disclosed in U.S. Pat. No. 4,516,487. Accordingly, the disclosure and contents of U.S. Pat. No. 4,516,487 are incorporated herein by reference.

In FIG. 1 there is depicted the sequential folding steps which the apparatus and machine of U.S. Pat. No. 4,516,487 performs in producing machine-folded burritos or similar products. Referring to FIG. 1 as well as FIGS. 2 and 3, a dough sheet 5, which may be a tortilla shell, is placed on a feed conveyor 6 and conveyed forwardly to Station I. A filling 7 may be deposited on the shell 5 by a reciprocating nozzle, not shown, during the forward motion of the nozzle which is synchronized with that of the conveyor 6. The mechanism at Station I operates so as to form a transverse fold or crease 8 containing the filling 7. Also in Station I, the leading portion 10 of the sheet or shell 5 is folded upwardly and backwardly over onto the rear portion thereby completing the transverse fold 8.

The partially formed product leaves Station I on the upper run 11 of a flat conveyor belt. As the product advances on the conveyor belt 11 forwardly from left to right, it passes between opposing sides belts 12—12 which engage the tortilla underneath opposite sides or flaps thereof which overhang the belt. The side belts 12 fold the sides upwardly and inwardly to further form the product into the condition indicated at Station II in FIG. 1 where it has two side folds 13—13 which extend generally parallel to each and to the direction of conveying movement. On leaving Station II, the product passes through Station III wherein the filled forward portion or leading portion is folded over on itself as indicated in FIG. 1 at Station III. Finally, the product advances to Station IV wherein it is again folded rearwardly on itself to form the complete burrito or other similar food product.

For a more detailed description of Station I and the functioning thereof reference may now be had to the following description taken in connection with FIGS. 4–11. The flat conveyor belt 15 of the conveyor 6 runs over a driven roller 16 at its discharge end and idler roller 17 at its entrance end. The roller 16 is suitably driven in a clockwise direction as viewed in FIGS. 4–6 by means of a timing belt 18 which runs over a sprocket or pulley 20. The roller 16 is opposed by a swingably mounted roller 21 supported between the upper ends of generally upright side arms 22 which are rigidly connected at their bottom ends with a generally horizontal link or arm 23. The support for the roller 21 comprising the arms 22 and 23 is integrally mounted on a shaft 24 which also carries a sprocket 25. For a more complete description the means and manner of driving the rollers 16 and 21 reference may be had to U.S. Pat. No. 4,516,487 and particularly FIG. 5 thereof. Suffice it to say that the roller 21 is reversibly driven so that in one mode it is driven clockwise as shown in FIG. 4 and in a second mode it is driven in a counterclockwise direction as shown in FIG. 5.

In addition to being reversibly driven, the roller 21 is also swingable toward and away from the roller 16 at the discharge end of the conveyor 6. This swinging action is obtained by extending and retracting the connecting rod 26 of a pneumatic cylinder 27 suitably linked to the left or outer end of the arm 23 by means the clevis and pin arrangement indicated 28. It will be seen that when the connecting rod 26 is extended the roller 21 will be swung away from the roller 16 and conversely, when the connecting rod 26 is retracted the roller 21 will be swung toward the roller 16. This swinging movement is indicated in FIGS. 4 and 5 with the roller 21 occupying its position juxtaposed to the roller 16 in FIG. 4 and as being swung away from roller 16 in FIG. 5.

The dough sheets 5 may be placed on the upper run 15 of the conveyor 6 either manually or by some suitable feeding mechanism. As the trailing edge of a dough sheet passes under the beam of a photocell 30, a timer (not shown) is actuated which in turn actuates the pneumatic cylinder 27 to swing the roller 21 away from roller 16, reverses the rotation of the roller 21 from clockwise to counterclockwise, and actuates a filling discharge or depositing nozzle indicated generally at 31. The details of the control means and the photocell circuit do not form a part of the present invention and U.S. Pat. No. 4,516,487 may be referred to for a more complete description thereof.

Referring now particularly to FIGS. 4 and 5, as the leading edge of dough sheet 5 leaves the belt 15 as it passes around roller 16 it will advance to and be picked up by roller 21 as shown in FIG. 4. Depending upon the stiffness and flexibility of the dough sheet 5, there will be somewhat of a dip or depression formed therein in passing from roller 16 to roller 21 as indicated at 32 in FIG. 4. As described in U.S. Pat. No. 4,516,487, when the roller 21 is swung away from roller 16 and its direction of rotation is reversed so as to be counterclockwise, a substantial crease or fold 33 (FIG. 5) is formed in the dough sheet. During this cooperative operation of the rollers 16 and 21 in forming the crease or fold, 33, the filling discharge nozzle 31 is suitably operated to discharge a predetermined amount of filling which is indicated at 34 in FIGS. 4 and 5.

Preferably the placement or orientation of the nozzle 31 relative to the rollers 16 and 21 is such that the filling 34 impacts onto the dough sheet 5 somewhat towards or closer to the roller 16 than to the roller 21 so that the dough sheet is afforded some support by the belt 15. By appropriately timing the discharge of the filling 34, the impact thereof onto the dough sheet 5 can desirably assist in the formation of the crease or fold 33. Preferably, the nozzle 31 is adjustably mounted so that it can be shifted to a position where optimum results are obtained. Such results will depend in part on the nature of the dough sheet 5 in respect to its relative flexibility, strength or toughness.

Depending upon the nature and fluidity of the filling 34, there may be some tendency for the same to spatter as it impacts the dough sheet 5. However, since the impact area will be confined to the crease or fold 33 any such splashing or spray will be confined to the crease or fold area and the depressed area between the opposing rollers 16 and 21.

After the fold or crease 33 with the filling 34 deposited therein leaves the rollers 16 and 21 it proceeds onto the flat conveyor belt 11 as indicated in broken line at 33' (FIG. 5) and underneath the upwardly turned ends of spaced cantilever rods 35. The manner in which the leading end portion 10 of a dough sheet is folded upwardly and rearwardly over the filling 34 during the transition that occurs in being conveyed under the rods 35 is fully described in U.S. Pat. No. 4,516,487. Reference may also be had to U.S. Pat. No. 4,516,487 for the apparatus and operations at Stations II, III and IV.

Reference may now be had to FIGS. 7-11 for a description of the filling discharge nozzle 31.

The nozzle 31 includes a main body 40 which has a hollow interior cavity 42 with inclined internal sides 41—41. A hole or opening 43 is provided in the top of the body 40 leading into the interior 42. A nipple of fitting 44 is welded or otherwise secured at the top of the body 40 so as to discharge through the opening 43 into the interior 42.

The filling material will be delivered to the fitting 44 and nozzle 31 from a feed pump of known type (not shown). The pump will be actuatable in known manner to deliver the filling in increments of predetermined amounts or size upon receiving an appropriate signal from the photocell 30 (FIG. 6).

The elongated discharge opening 45 (FIG. 8) in the bottom of the nozzle body 40 is of such size as to normally require that it be partially closed. The adjustable partial closing is provided by means of a nozzle closure plate 46 having two aligned elongated discharge openings 47—47. The plate 46 is provided at opposite ends with openings 48—48 to receive bolts 50—50.

Normally the discharge openings 47—47 are larger than required and the size thereof can be suitably adjusted by means of shiftable end plates 51—51. One of these plates 51 is shown in FIG. 5 with two elongated bolt receiving openings 52—52. The bolts 50 will extend through the elongated slots 52—52 in each of the plates 51 and allow these plates to be shifted inwardly or outwardly as desired and then clamped into place by tightening the bolts in tapped holes 53—53 in the underside of the nozzle body 40. The filling material can now be extruded through the open or uncovered portions of the discharge openings 47.

We claim:

1. In apparatus for depositing a foodstuff filling on a dough sheet and forming the sheet so as to enclose the filling therein, comprising, dough sheet conveyor means, filling depositing means, and folding means; and wherein filler is deposited on the dough sheet in a crease formed therein and thereafter the dough sheet is folded around the filling; in combination;
    a dough sheet feed section of said conveyor means having a discharge end roller rotatable about an axis extending transversely to the direction of movement of said conveyor means and means for rotating said discharge end roller continuously in one direction;
    a crease-forming roller adjacent to said discharge end roller having its upper surface disposed at approximately the same elevation as the discharge end of said dough sheet feed section and rotatable about an axis substantially parallel to said axis of rotation of said discharge end roller, reversible drive mean for driving said crease-forming roller alternately in opposite directions, and first control means for controlling said reversible drive means to drive said crease-forming roller in the same rotative direction as said discharge end roller until a leading portion of each dough sheet delivered by said dough sheet section has been transferred therefrom onto said crease-forming roller and then to drive said crease-forming roller in the opposite rotative direction, whereby a portion of said dough sheet is drawn down between said rollers so as to form a transverse filling-receiving crease therein; and,
    filling depositing means disposed above the opposing surfaces of said discharge end roller and said crease-forming roller, and second control means for said filling depositing means to deposit filling into each filling-receiving crease.

2. In the apparatus called for in claim 1, said crease-forming roller being shiftably mounted between being juxtaposed to said discharge end roller when receiving said leading portion of each dough sheet and being spaced from said discharge end roller when said each filling-receiving crease is being formed, and third control means for controlling said shifting of said crease-forming roller.

3. In the apparatus called for in claim 1, said second control means causing filling to be discharged so that the impact of the discharging filler assists in the formation of said filling-receiving crease.

4. In the apparatus called for in claim 1, said filling depositing means being disposed so that fillings discharged therefrom impact the dough sheets in areas thereof which are at least partially supported by said discharge end roller.

* * * * *